United States Patent
Chang et al.

(10) Patent No.: US 6,877,102 B2
(45) Date of Patent: Apr. 5, 2005

(54) CHIPSET SUPPORTING MULTIPLE CPU'S AND LAYOUT METHOD THEREOF

(75) Inventors: Nai-Shung Chang, Taipei Hsien (TW); Tsai-Sheng Chen, Taipei Hsien (TW); Shu-Hui Chen, Taipei Hsien (TW)

(73) Assignee: VIA Technologies, Inc., Taipei Hsien (TW)

( * ) Notice: Subject to any disclaimer, the term of this patent is extended or adjusted under 35 U.S.C. 154(b) by 555 days.

(21) Appl. No.: 10/013,983

(22) Filed: Dec. 10, 2001

(65) Prior Publication Data

US 2003/0041193 A1 Feb. 27, 2003

(30) Foreign Application Priority Data

Aug. 21, 2001 (TW) .................................... 90120461 A

(51) Int. Cl.[7] .................................................. G06F 1/04
(52) U.S. Cl. ...................... 713/500; 713/400; 713/401; 713/501; 713/600; 713/601
(58) Field of Search ................................. 713/400, 401, 713/500, 501, 600, 601

(56) References Cited

U.S. PATENT DOCUMENTS

| | | | | |
|---|---|---|---|---|
| 5,546,563 A | * | 8/1996 | Chuang | 703/27 |
| 5,761,479 A | * | 6/1998 | Huang et al. | 710/301 |
| 5,815,715 A | * | 9/1998 | Kuçukçakar | 717/141 |
| 5,974,500 A | * | 10/1999 | Maletsky et al. | 713/500 |
| 6,260,088 B1 | * | 7/2001 | Gove et al. | 710/100 |
| 6,513,125 B1 | * | 1/2003 | Garde | 713/500 |
| 6,590,827 B2 | * | 7/2003 | Chang et al. | 365/233 |
| 6,675,311 B2 | * | 1/2004 | Hotta et al. | 713/500 |

* cited by examiner

*Primary Examiner*—A. Elamin
(74) *Attorney, Agent, or Firm*—J.C. Patents

(57) ABSTRACT

A chipset to support multiple CPU's and a layout method thereof. Those independent signal lines for delivering high frequency clock signals of the chipset are isolated from using by other signals without being multiplexed. Trace length of the independent signal line is shorter than that of the others. The spaces between the independent signal line and others are also larger than that between other signal lines. Signal transmission quality is significantly upgraded because the high frequency clock signal is not multiplexed and isolated from others.

16 Claims, 2 Drawing Sheets

CHIPSET SUPPORTING MULTIPLE CPU'S AND LAYOUT METHOD THEREOF

CROSS-REFERENCE TO RELATED APPLICATION

This application claims the priority benefit of Taiwan application serial no. 90120461, filed Aug. 21, 2001.

BACKGROUND OF THE INVENTION

1. Field of the Invention

The invention relates in general to a control chipset of a computer motherboard, and more particularly, to a control chipset that supports various kinds of central processing units (CPU's) and a layout method thereof.

2. Description of the Related Art

As the personal computer rapidly develops, various kinds of CPU's are being manufactured. To comply with the variety of CPU's, motherboards able to support various kinds of CPU's are being developed. Further, because the processing speed of the CPU's continuously increases, signal transmission and reliability are of great concern to computer manufacturers. A good transmission quality results in better system performance and enhances reliability. Thus, how to fabricate a chipset with good signal transmission quality and reliability that supports various kinds of CPU's has become an important topic.

FIG. 1A and FIG. 1B are block diagrams showing a computer system accommodating a first type CPU and a second type CPU, respectively. Referring to FIGS. 1A and 1B, the chipset 110 (normally a north bridge chip, N/B) of a computer system can be coupled to a first type CPU 120 or a second type CPU 130, e.g., CPU 120 and 130 may be Intel PIII processor and AMD K7 processor, respectively.

Since Intel PIII processors require only one clock signal to perform data transactions with the N/B, while AMD K7 processor requires one input clock signal and one output clock signal to perform data transactions with the N/B, the output clock signal function is similar to the strobe signal. In the prior art, the N/B applied to the Intel PIII processor does not require an additional clock signal pin, while the conventional AMD K7 processor requires more than ten clock signal pins for the N/B. Thus, when designing a N/B applicable to both Intel PIII and AMD K7 processors, under the consideration of reserving I/O pin counts, the clock signal lines should share pins with other signal lines (such as the address (A/D) lines) via multiplexing mechanism.

FIG. 2 shows a conventional chipset that supports various CPU's. In FIG. 2, the chipset 210 is a north bridge including a first system logic circuit 220, a second system logic circuit 230, a first switch circuit 240, a second switch circuit 250, a first double defined signal pin 241, and a second double defined signal pin 251. The first system logic circuit 220 is applicable for the chipset coupled to an Intel PIII processor, while the second system logic 230 is applicable for the chipset coupled to the AMD K7 processor. When the chipset 210 is used for the AMD K7 processor, the first and second switch circuits 240 and 250 are used to control the connection switching between the first and the second double defined signal pins 241, 251 with the second system logic circuit 230. Meanwhile, the second double defined signal pin 251 is connected to the clock signal CLK of the second system logic circuit 230 via the second switch circuit 250.

FIG. 3 shows the second switch circuit 250 composed of transmission gates. Referring to FIG. 3, the second switch circuit 250 includes a first transmission gate 310 and the second transmission gate 320. The first transmission gate 310 has a first terminal connected to an address signal line ($HA_4$ line), while the second transmission gate 320 has a first terminal connected to the clock signal line (CLK line). The second terminals of the first and the second transmission gates 310 and 320 are connected together for output. A control signal CTLA which indicates whether an Intel or AMD processor is coupled to the chipset 210 is used to control outputs of the second switch circuit 250. For example, $HA_4$ line is selected when the control terminal CTLA is high, and the CLK line is selected when the control terminal CTLA is low.

The above circuit and layout design has some drawbacks. Basically, signals with the same character can share one pin for signal transmissions. The above switch circuits controlling the transmissions at the signal pins are used for the Intel PIII processor or the AMD K7 processor. However, if signals with different characters such as $HA_4$ (address) and CLK (clock) in the second switch circuit 250 are multiplexed from a shared pin, e.g., the second double defined signal pin 251, unwanted crosstalk interference will be arisen during the signal transmission. As a result, the signal transmission quality is degraded. A conventional transmission gate is known as a non-ideal switch circuit for the north bridge chip. In high frequency applications, if a non-linear circuit device (such as a transmission gate or TTL) is used as the transmission path for switching signals, the capacitance-induction effect may introduce unexpected ground bounce noises, which significantly degrades signal quality.

The clock signal and strobe signal are very high frequency signals in comparison with others. Therefore, when applying the conventional design to the chipset supporting more than one CPU, crosstalk interference will be arisen when multiplexing a pin shared by several signal lines especially that every one of the signal lines is usually too close to its adjacent ones. Further, undesired ground bounce noises will also be introduced when the multiplex switch circuit is configured by using transmission gates, which seriously affecting the signal transmission quality

SUMMARY OF THE INVENTION

The invention provides a chipset that supports multiple CPU's. The chipset includes a first system logic circuit connected to a first type CPU, a second logic circuit connected to a second type CPU, a double defined signal pin, an independent clock pin and a multiplex switch circuit. The independent clock pin coupled to the second system logic circuit is defined as the clock signal pin, which is not further defined as another signal pin. The multiplex switch circuit is coupled to the first system logic circuit, the second system logic circuit and the double defined signal pin so that the first signal from the first system logic circuit or the second signal from the second system logic circuit can be transferred via the double defined signal pin. The trace length connected between the independent clock signal pin and the second system logic circuit is shorter than before, and the spaces between the clock signal line and others are larger than that between two of the other adjacent signal lines.

The invention further provides a layout method of the chipset supporting multiple CPU's. The chipset comprises at least a first system logic circuit connected to a first type CPU and a second system logic circuit connected to a second type CPU. A double defined signal pin is provided for signal transmission under controlled by multiplexing mechanism.

A multiplex switch circuit is provided and connected to the first system logic circuit, the second system logic circuit and the double defined signal pin. Thereby, the first signal of the first system logic circuit or the second signal of the second system logic circuit is connected to the double defined signal pin. An independent clock pin is provided for only one kind of signal. The second system logic circuit connects to the independent clock pin with a trace length shorter than that connected between other signal pins. The spaces between the clock signal line and other signal lines are larger than before, and furthermore, are also larger than the spaces between other signal lines, such as the spaces between two adjacent lines of the address or control signal lines.

The invention provides a chipset to support various kinds of CPU's and a layout method thereof. A signal such as the clock signal that usually operates under high frequency uses an independent pin without being multiplexed with other signal lines, which significantly eliminates the disadvantage of interference caused from line-sharing with others. The signal transmission quality is thus enhanced. In the embodiment, the clock signal is isolated from other signals, which indicates that the length for the second system logic circuit connecting with the independent clock pin is shorter than before. Furthermore, the connection length is also shorter than that with other signal lines, e.g., address lines or control signal lines. The spaces between the independent clock line with others are also larger than before in the embodiment. Several advantages are offered by the present invention. Firstly, all signals transferred in the embodiment can be prevented from over attenuation. And secondly, the complexity of chipset circuits are simplified so that an efficient way is suggested for layout designs.

Both the foregoing general description and the following detailed description are exemplary and explanatory only and are not restrictive of the invention, as claimed.

DESCRIPTION OF THE PREFERRED EMBODIMENTS

Figure 1A:
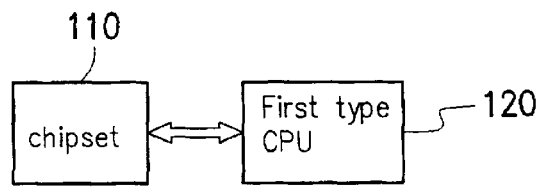
FIGS. 1A and 1B shows a block diagram of a chipset that can support a first type CPU and a second type CPU.
Figure 1B:
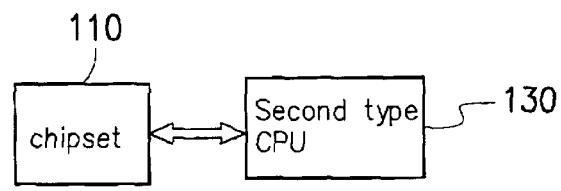
Figure 2:
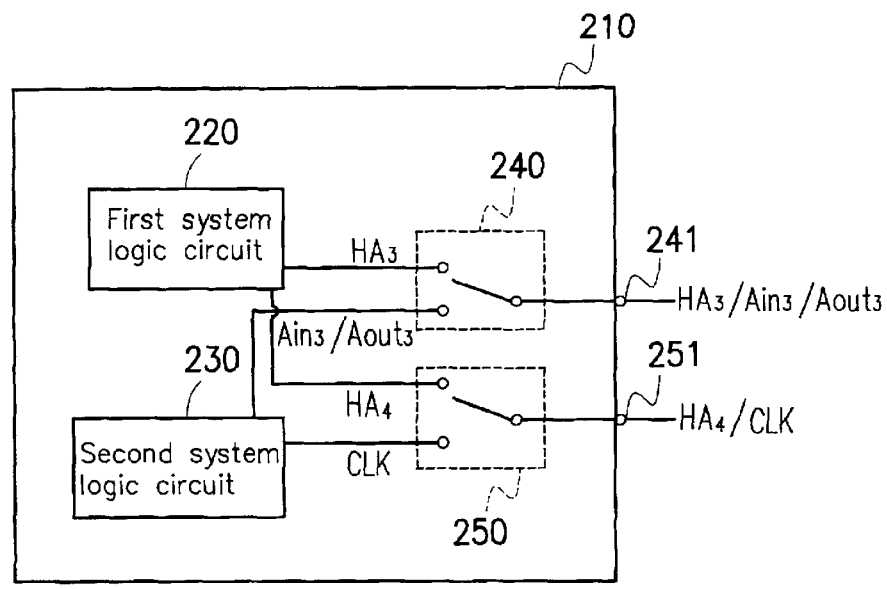
FIG. 2 a conventional chipset that can support multiple CPU's.
Figure 3:
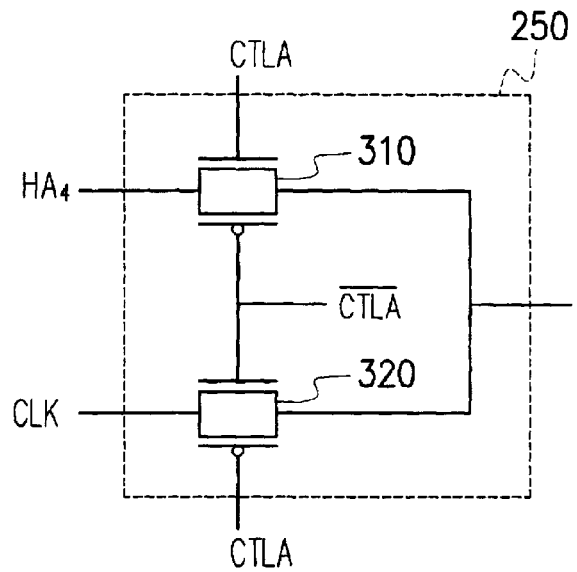
FIG. 3 shows a switch circuit formed of transmission gates.

Referring to FIGS. 1A and 1B, the chipset for supporting various kinds of CPU's can be applied to computer systems or the likes. To achieve the objective of supporting two different kinds of CPU's, the chipset provided by the invention can be coupled to a first type CPU or a second type CPU. The first type CPU includes the Pentium series of CPU such as the PIII processor, and the second type CPU includes the AMD series CPU such as the AMD K7 processor.

The Intel PIII processor requires only one kind of clock signal to perform data transaction and transmission with a north bridge chip. On the other hand, the AMD K7 processor requires an input clock signal and an output clock signal that the output clock signal is functioned similarly as a strobe signal to transact and transmit data with the north bridge. While designing a north bridge chip to support these two CPU's, it is realized that less clock signal pins are needed for the Intel processors than that for the AMD K7 processor. In the embodiment, any high frequency signal with different characteristics from other signals will be delivered by an independent signal pin. For example, the clock signal for the AMD K7 signal is transferred by an independent signal pin that is isolated from the other signal pins for the Intel PIII processor.

From the view point of the motherboard designer, the chipset has a plurality of pins including the independent clock pin and a plurality of double defined signal pins. The independent clock pin is coupled to the second type of CPU as a clock signal pin that is not connected to the first type CPU. Other double defined signal pins can be coupled to the first type CPU or the second type CPU by means of switch circuits. When the chipset couples to the first type CPU, the double defined signal pins are defined as the signal pins for the first type CPU. When the chipset couples to the second type CPU, the double defined signal pins are defined as the signal pins for the second type CPU.

Figure 4:
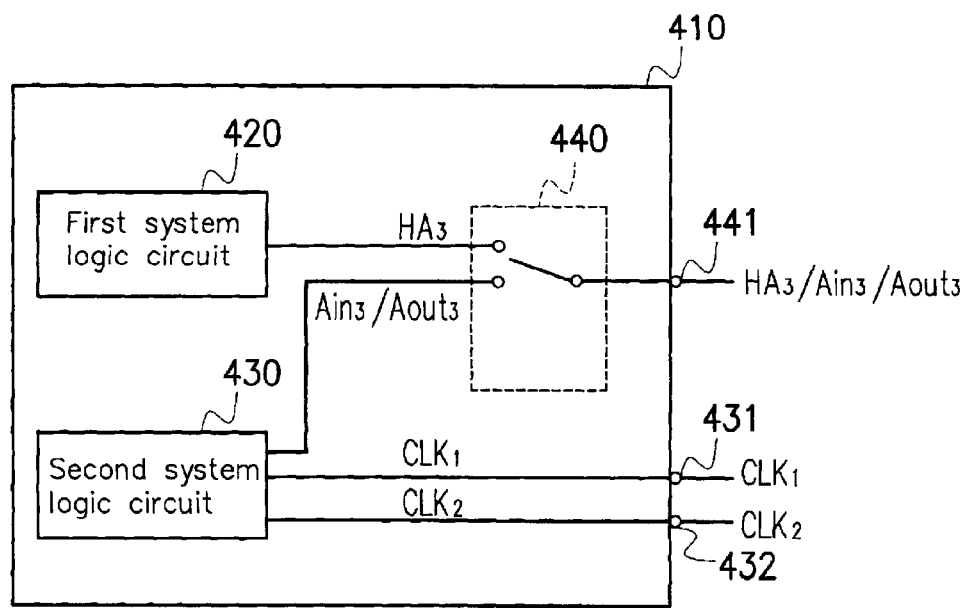
FIG. 4 shows an embodiment of a chipset that supports various kinds of CPU's.

FIG. 4 shows the chipset supporting multiple CPU's of the invention. Referring to FIG. 4, the chipset 410 supporting multiple CPU's comprises at least a first system logic circuit 420, a second system logic circuit 430, a double defined signal pin 441, an independent clock pin 431 and a multiplex switch circuit 440. The so-called system logic circuit means the internal logic control circuit in a typical chipset. The first system logic circuit is applicable to the chipset 410 and is connected to the first type CPU. The second system logic circuit is applicable to the chipset 410 and is connected to the second type CPU. The first type CPU includes a Pentium series CPU such as PIII processor, and the second type CPU includes an AMD series CPU such as AMD K7 processor.

The multiplex switch circuit 440 of the chipset 410 is coupled to the first system logic circuit 420, the second system logic circuit 430 and the double defined signal pin 441. The signals of the first system logic circuit 420 and the second system logic circuit 430 are thus connected to the double defined signal pin 441. That is, when the chipset 410 couples to the Intel PIII processor, the chipset 410 controls the multiplex switch circuit 440 to establish a first connection between the double defined signal pin 441 and the first system logic circuit 420. Similarly, when the chipset 410 has to couple with the AMD K7 processor, a second connection between the double defined signal pin 441 and the second system logic circuit 430 is also established via the multiplex switch circuit 440. An Intel or AMD processors may transfer signals via the first or second connections, respectively. A control signal CTLA (not shown in FIG. 4) described in the background may be used to control outputs of the multiple switch circuit 440 so that associated connections can be established according to employed processors.

The invention is characterized by coupling the independent clock pin 431 to the second system logic circuit 430 as the clock signal pin, and the independent clock pin 431 is isolated from other signals. That is, when the chipset 410 is coupled to the AMD K7 processor, the connection between the second system logic circuit 430 and the AMD K7 processor via an independent clock pin forms an isolation path without coming across any multiplex circuit. The clock signal line connected between the independent clock pin and the second system logic circuit is shorter than that between other signal lines. For example, the trace length (connection length) of the independent clock pin is significantly shorter than before because the independent clock pin directly connects with associated clock signal pins without coming across any switch circuit (e.g., the second switch circuit 250). Therefore, every trace length of address line or control signal line in chipset 410 should be longer than that of the independent clock pin. Further, the spaces between the independent clock pin and the other signal lines are larger than that between two adjacent lines of the other signal lines. For example, each address or control signal line may be closer to its adjacent ones, which significantly decreases the spaces between two adjacent ones of the address or control signal lines, however, the independent clock pin does not follow this constraint. The circuit complexity of chipset 410 is simplified and an efficient way is suggested for layout designs.

It is appreciated to people having ordinary skills in the art that the above clock signals such as the strobe signal or other clock signals are high frequency signals with different signal quality. If the second type CPU has such strobe signals, clock signals, or the likes, the chipset 410 should allocate independent signal pins 432 for delivering signals for them.

Accordingly, a layout method for a chipset that supports multiple CPU's is provided by the invention. The chipset comprises a first system logic circuit and a second system logic circuit. A least one double defined signal pin is provided firstly that every double defined signal pins is used as signal transmission pins. A multiplex switch circuit is provided and connected to the first system logic circuit, the second system logic circuit and the double defined signal pins. The multiplex switch circuit can be connected to either the first system logic circuit or the second system logic circuit according to an indication of a control signal (e.g., CTLA). An independent clock pin is provided for delivering only one kind of signal. The independent clock pin is connected to the clock signal of the second system logic circuit with a signal line shorter than that between other signal pins. Further, the spaces between the clock signal line and other signal lines are larger than that between other signal lines.

The chipset and layout method of the invention separate and isolate the high frequency signals such as the clock or strobe signals, so that every pin for delivering such high frequency signals is isolated and multiplexed with other signal lines. Advantages as follows are thus obtained:

1. The fatal noise interference during signal transmission is reduced.

2. The internal circuit complexity of the chipset is reduced.

3. The trace layout for the chipset is easy to make.

Other embodiments of the invention will appear to those skilled in the art from consideration of the specification and practice of the invention disclosed herein. It is intended that the specification and examples are to be considered as exemplary only, with a true scope and spirit of the invention being indicated by the following claims.

What is claimed is:

1. A chipset supporting multiple CPU's, comprising:
   a first system logic circuit, applicable to the chipset and connected to a first type CPU;
   a second system logic circuit, applicable to the chipset and connected to a second type CPU;
   a double defined signal pin, used as a signal transmission pin;
   a multiplex switch circuit, coupled to the first system logic circuit, the second system logic circuit and the double defined clock pin for establishing a first conecting between the first system logic circuit and the double defined clock pin, and for establishing a second connection between the second system logic circuit and the double defined clock pin wherein the first type CPU may transfer signals with the first system logic circuit via the first connection and the second type CPU may transfer signals with the second system logic circuit via the second connection; and
   an independent clock pin, coupled to the second system logic circuit as a clock signal pin, wherein the independent clock pin forms an isolation path without coming across the multiplex circuit so as to be isolated from other signal pins.

2. The chipset according to claim 1, wherein the first type CPU includes a Pentium series CPU and the second type CPU includes an AMD series CPU.

3. The chipset according to claim 1, wherein a frequency transferred by the independent clock pin is higher than a frequency transferred by the double defined signal pin.

4. The chipset according to claim 1, further comprising:
   an independent strobe pin, coupled to the second system logic circuit as a strobe signal pin, wherein the independent strobe pin is isolate from other signal pins.

5. The chipset according to claim 1, wherein a trace length between the independent clock pin and the second system logic circuit is shorter than a trace length of an address line or a control signal line of the chipset.

6. The chipset according to claim 1, wherein a space between the independent clock pin and other signal lines is larger than a space between two adjacent lines of address lines or between two adjacent lines of control signal lines of the chipset.

7. The chipset according to claim 1, wherein the first connection is established when a control signal indicates the first type CPU is coupled with the chipset and the second connection is established when a control signal indicates the second type CPU is coupled with the chipset.

8. A layout method of a chipset supporting multiple CPU's, wherein the chipset comprises a first system logic circuit used for coupling to a first type CPU and a second system logic circuit used for coupling to a second type CPU, the layout method comprising:
   providing a double defined signal pin as a signal transmission pin;
   providing a multiplex switch circuit;
   coupling the multiplex switch circuit to the first system logic circuit, the second system logic circuit, and the double defined signal pin for establishing a first connection between the first system logic circuit and the first type CPU to transfer signals via the double defined signal pin, or for establishing a second connection between the second system logic circuit and the second type CPU to transfer signals via the double defined signal pin; and
   providing an independent clock pin for coupling with the second system logic circuit for transferring signals, the independent clock pin forming an isolation path without coming across the multiplex circuit, wherein a frequency transferred by the independent signal pin is higher than a frequency transferred by the double defined signal pin.

9. The layout method according to claim 8, wherein the first type CPU includes a Pentium series CPU and the second type CPU includes an AMD series CPU.

10. The chipset according to claim 8, wherein a trace length between the independent clock pin and the second system logic circuit is shorter than a trace length of an address line or a control signal line of the chipset.

11. The chipset according to claim 8, wherein a space between the independent clock pin and other signal lines is larger than a space between two adjacent lines of address lines or between two adjacent lines of control lines of the chipset.

12. A chipset supporting multiple central processing units, comprising:

a first system logic means for coupling to a first type CPU (central processing unit);

a second system logic means for coupling to a second type CPU;

a double defined signal pin for transferring signals;

switch means, coupled to the first system logic means, the second system logic means and the double defined signal pin for establishing a first connection between the first system logic means and the double defined signal pin to transfer signals between said first system logic means and said first type CPU when a control signal indicates the first type CPU is coupled with the chipset, and for establishing a second connection between the second system logic means and the double defined signal pin to transfer signals between said second system logic means and said second type CPU when the control signal indicates the second type CPU is coupled with the chipset; and an independent clock pin, coupled to the second system logic means for transferring signals, forming an isolation path without coming across the switch means, and isolated from other signal pins, wherein a frequency transferred by the independent clock is higher than a frequency transferred by the double defined signal pin.

13. The chipset according to claim 12, wherein the first type CPU includes a Pentium series CPU and the second type CPU includes an AMD series CPU.

14. The chipset according to claim 12, wherein said independent signal pin couples with a strobe pin or a clock pin of the second type CPU.

15. The chipset according to claim 12, wherein a trace length between the independent clock pin and the second system logic circuit is shorter than a trace length of an address line or a control signal line of the chipset.

16. The chipset according to claim 12, wherein a space between the independent clock pin and other signal lines is larger than a space between two adjacent lines of address lines or between two adjacent lines of control lines of the chipset.

* * * * *